Patented Jan. 5, 1943

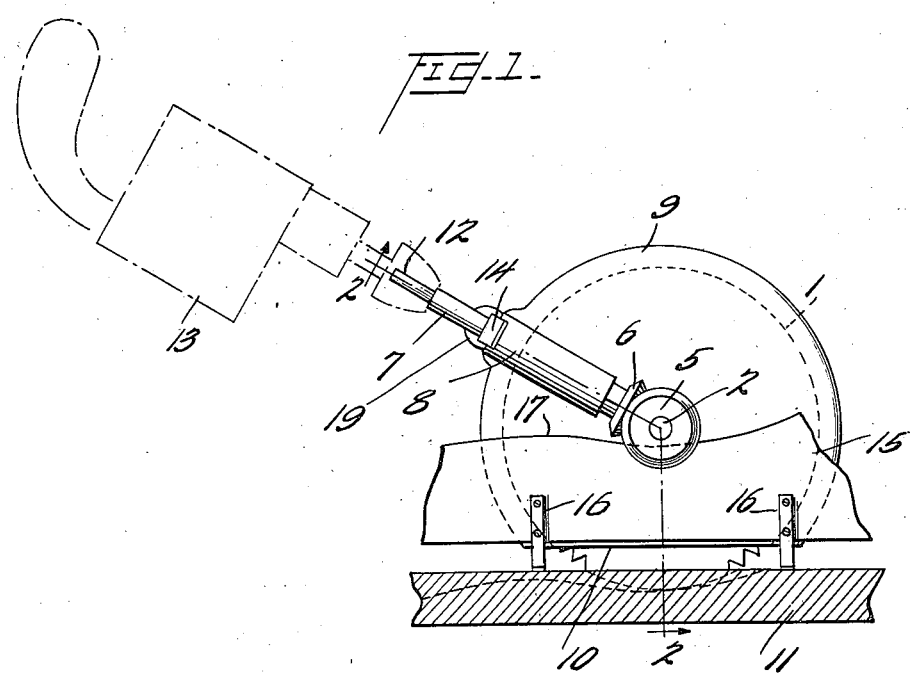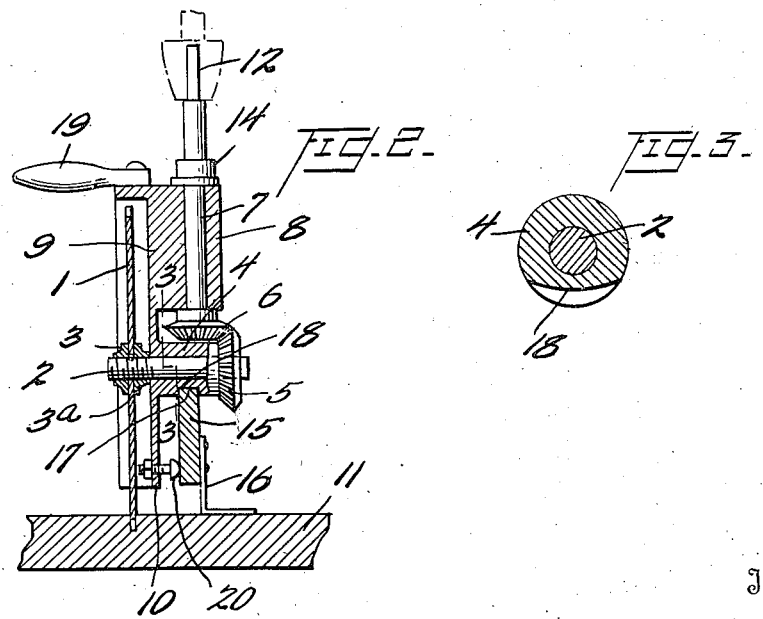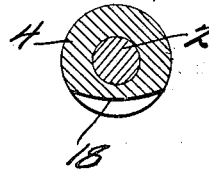

2,307,464

UNITED STATES PATENT OFFICE 2,307,464

PORTABLE TOOL FOR CUTTING PATTERNS

William Metting, Morrisville, Pa.

Application January 11, 1941, Serial No. 374,125

2 Claims. (Cl. 143—43)

This invention relates to woodworking tools for cutting transversely curved shapes, such for example as patterns for dies designed for stamping out airplane wing and fuselage sections, automobile bodies and fenders, plates for the hulls of ships and various other parts such as are required to be made accurately to predetermined contours.

An important object of my invention is to provide a portable cutting tool designed to be connected to a source of power and arranged to be manually moved along templates spanning the work so as to form a series of cuts across the work at laterally spaced intervals, such cuts being of varying depths as determined by the contours of the templates. By smoothly forming the series of cuts by removing the material therebetween by means of a chisel, gouge or other suitable tool, a replica of the curved surface to be produced upon the finished article is obtained.

Another object of my invention is to provide a portable cutting tool of the above character including a rotary disk cutter and means for supporting the cutter upon the curved edge of the template and for retaining the cutter in a fixed plane to the template during its travel therealong.

Other objects and advantages will be apparent from the following detailed description of a preferred embodiment of the invention, reference being had to the annexed drawing in which:

Figure 1 is a side view of a portable cutting tool designed for cutting patterns;

Figure 2 is a cross-section through the tool of Fig. 1 taken on the line 2—2; and Figure 3 is a cross-sectional view of the guide slot by which the tool is supported on the template.

Referring to the portable cutting tool shown in the drawing, 1 indicates a rotary cutting disk, such for example as a circular saw blade having a toothed periphery, which is keyed upon one end of a drive shaft 2, and is detachably held in association with the shaft by collars 3 and 3a threaded upon the shaft. Drive shaft 2 is supported for rotation in a generally cylindrical bearing 4, and upon the end of the shaft which projects beyond the bearing is secured a bevel gear 5 which meshes with a companion bevel gear 6 mounted upon the end of an inclined transmission shaft 7.

The transmission shaft 7 is journaled in a bearing block 8 projecting outwardly from one lateral face of a circular guard 9 surrounding the major part of the cutting disk 1 but terminating above the lower edge of this disk (as indicated at 10) so as to allow clearance for the unobstructed up and down movement of the tool with respect to the work, indicated at 11. The upper end of the transmission shaft 7 projects beyond the bearing block 8 and terminates in a reduced portion 12 which is designed to be detachably coupled to the chuck of an electric motor-driven drill 13, indicated in phantom outline. A thrust bearing 14 supported on the upper end of bearing block 8 holds the transmission shaft against outward longitudinal movement.

The tool is adapted to be supported upon the curved upper edge of a template 15. The template is secured to the works 11 by brackets 16 so that the curved upper edge 17 of the template extends across the work at predetermined distances from the upper surface of the latter, that is, the surface of the work which it is ultimately intended shall correspond to the contour of the template. The upper edge of the template fits within a guide slot 18 formed in the circumference of the bearing 4 and this slot is curved in a direction transversely of the bearing, as indicated in Fig. 3, so as to afford a rocking support for the tool upon the template.

A handle 19 is secured to the guard 9 adjacent the upper end of bearing block 8 and extends laterally outward from one side of the guard so as to provide means for manually moving the tool along the template. In order to maintain the cutting disk in a plane parallel to the template (and consequently perpendicular to the work) during operation of the tool, a pin 20 is secured to the lower end of the guard 9, this pin extending laterally outward from the guard and having a rounded head arranged to contact the opposed flat vertical surface of the template.

The operation of the portable cutting tool described above is as follows:

When a pattern or other body having a transversely curved surface is to be made, a series of templates are formed having their upper edges fashioned so as to correspond to the desired contours of the pattern at spaced intervals therealong. These templates are then temporarily secured to the work at appropriate locations thereon by means of the brackets 16. The squared end of the transmission shaft 7 is introduced into the chuck of an electric drill 13 and when the current is turned on the drill rotates this shaft and, through bevel gears 6 and 5, drive shaft 2 carrying the cutting disk 1.

By engaging the curved upper edge 17 of template 15 within guide slot 18 and by manually moving the tool along the template by means of handle 19, an incision is cut in the upper surface of the work corresponding to the contour of the template (as indicated in dotted lines in Fig. 1). The weight of the tool is sufficient to maintain the tool in contact with the template and to insure that the cutting disk will penetrate the work to the maximum extent, while the pin 20 prevents tilting of the tool and retains the cutting disk in upright position such as is necessary in order that the incision will accurately correspond to the contour of the template. The rocking support afforded by the guide slot 18 allows the tool to ride smoothly along the undulations presented by the template.

After the series of parallel incisions have been made along the work the templates are removed, the material between the incisions is cut away to smoothly finish off the surface of the work and the pattern is ready for use in the molding operation according to usual practice.

While the invention has been described in connection with a pattern cutting tool, manifestly its use is not restricted to such a field but may be advantageously employed in various other connections. For example, by substituting an abrasive wheel for a disk saw, the tool may be used for grinding metal castings to shape.

It should be understood that it is not desired to limit the invention to the exact details of construction herein shown and described, for obvious modifications within the scope of the claims may occur to persons skilled in the art.

I claim:

1. A portable tool for use in cutting transversely curved shapes comprising an upright guard, a bearing extending laterally from the guard, a shaft rotatably supported within said bearing, a circular cutting disk mounted upon said shaft, transmission means adapted to be connected to a source of power for driving said cutting disk, the lower side of said bearing being recessed so as to define a guide slot adapted to straddle the upper edge of a template, the bottom of said recess being arcuately curved so as to allow rocking movement of the bearing upon the template, and a handle for traversing the tool along the template.

2. A portable tool for use in cutting transversely curved shapes comprising an upright guard, a bearing extending laterally from the guard, a shaft rotatably supported within said bearing, a circular cutting disk mounted upon said shaft, transmission means adapted to be connected to a source of power for driving said cutting disk, the lower side of said bearing being recessed so as to define a guide slot adapted to straddle the upper edge of a template, the bottom of said recess being arcuately curved so as to allow rocking movement of the bearing upon the template, a gage mounted upon the guard and directed perpendicularly thereto so as to engage the vertical face of the template at an elevation above the lower circumferential edge of the cutting disk, said gage serving to maintain the tool in upright position during its operation, and a handle for traversing the tool along the template.

WILLIAM METTING.